United States Patent
Didcock et al.

(10) Patent No.: US 10,057,411 B2
(45) Date of Patent: Aug. 21, 2018

(54) TECHNIQUES TO ACCESS MESSAGING SERVICES FOR BRANCH OFFICES

(71) Applicant: Microsoft Technology Licensing, LLC, Redmond, WA (US)

(72) Inventors: Cliff Didcock, Sammamish, WA (US); Michael Wilson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/698,108

(22) Filed: Apr. 28, 2015

(65) Prior Publication Data

US 2015/0244859 A1      Aug. 27, 2015

Related U.S. Application Data

(63) Continuation of application No. 11/973,737, filed on Oct. 10, 2007, now Pat. No. 9,049,051.

(51) Int. Cl.
| | |
|---|---|
| *H04L 12/66* | (2006.01) |
| *H04M 3/42* | (2006.01) |
| *H04L 12/54* | (2013.01) |
| *H04L 12/58* | (2006.01) |
| *H04M 3/533* | (2006.01) |

(Continued)

(52) U.S. Cl.
CPC .... *H04M 3/42042* (2013.01); *H04L 12/5692* (2013.01); *H04L 47/70* (2013.01); *H04L 51/36* (2013.01); *H04L 65/1006* (2013.01); *H04M 3/42382* (2013.01); *H04M 3/53308* (2013.01); *H04M 7/0057* (2013.01); *H04L 51/00* (2013.01)

(58) Field of Classification Search
USPC ........ 370/352, 353, 354; 379/272, 273, 274; 455/412.1, 412, 2, 413
See application file for complete search history.

(56) References Cited

U.S. PATENT DOCUMENTS

| | | |
|---|---|---|
| 5,675,631 A | 10/1997 | Kaminsky et al. |
| 6,282,192 B1 | 8/2001 | Murphy et al. |

(Continued)

OTHER PUBLICATIONS

"Dynamically Rerouting Calls Using Automated Alternate Routing", <http://safari.oreilly.com/1587051397/ch02lev1sec4>, 2007, 2 pages, author unknown.

(Continued)

*Primary Examiner* — Alvin Zhu

(57) ABSTRACT

Techniques to access messaging services for branch offices are described. In one embodiment, for example, an apparatus may include a network interface for a packet-switched network, a private branch exchange for a circuit-switched network, and a gateway to couple to the network interface and the private branch exchange. The gateway may be operative to establish a packet-switched call connection with the network interface and a circuit-switched call connection with the private branch exchange. The gateway may further include a call router to route a call request over a circuit-switched network with the private branch exchange on behalf of a call terminal to access messaging services from a data center with a messaging server when the call terminal and the network interface are unavailable. Other embodiments are described and claimed.

20 Claims, 4 Drawing Sheets

(51) Int. Cl.
*H04M 7/00* (2006.01)
*H04L 29/06* (2006.01)
*H04L 12/911* (2013.01)

(56) References Cited

U.S. PATENT DOCUMENTS

| | | | |
|---|---|---|---|
| 6,307,853 | B1 | 10/2001 | Storch et al. |
| 6,510,219 | B1 | 1/2003 | Wellard et al. |
| 6,870,827 | B1 | 3/2005 | Voit et al. |
| 7,012,888 | B2 | 3/2006 | Schoeneberger et al. |
| 7,995,562 | B2 * | 8/2011 | Purnadi ............. H04W 36/0022 370/331 |
| 2002/0188755 | A1 | 12/2002 | Yeom |
| 2003/0181209 | A1 | 9/2003 | Forte |
| 2005/0213740 | A1 | 9/2005 | Williams et al. |
| 2005/0287993 | A1 * | 12/2005 | Gogic ................... H04M 1/658 455/413 |
| 2006/0251053 | A1 | 11/2006 | Croak et al. |
| 2007/0207782 | A1 | 9/2007 | Tran |
| 2008/0032704 | A1 | 2/2008 | O'Neil et al. |
| 2008/0126216 | A1 | 5/2008 | Flensted-Jensen et al. |

OTHER PUBLICATIONS

"Ericsson Mobility Gateway", Ericsson Enterprise AB, 2006, 4 pages, author unknown.
"MultiVOIP", MultiTech Systems, 2004, 4 pages, author unknown.
"Using Overlay Networks to Improve VoIP Reliability", Date: Oct. 11, 2004, pp. 392-401, vol. 3299/2004, Automated Technology for Verification and Analysis, Springer Berlin/Heidelberg, http://www.springerlink.com/content/97n7635t5hypn2lf/.
"Cisco Support Community; Call Manager", retrieved at <https://supportforums.cisco.com/document/6581/callmanager>, Jun. 9, 2009, 7 pages (author unknown).
"Voice Mail Connectivity to Cisco CallManager", retrieved at <http://www.cisco.com/en/US/docs/voice_ip_comm/cucm/admin/4_1_3/ccmsys/a06vmccm.html>, Nov. 14, 2007, 6 pages, (author unknown).
"Automated Alternate Routing Configuration", retrieved at <http://www.cisco.com/c/en/us/support/docs/voice-unified-communications/unified-communications-manager-version-80/113478-aar-config.html>, Mar. 30, 2012, 5 pages (author unknown).
"Dial Plan", retrieved at <http://www.cisco.com/en/US/docs/voice_ip_comm/cucm/srnd/4x/42dialpl.html>, Feb. 13, 2008, 90 pages (author unknown).

* cited by examiner

200

```
RECEIVE A CALL REQUEST FOR A CALL TERMINAL OF
A BRANCH OFFICE
202
```

```
DETERMINE THE CALL TERMINAL IS UNAVAILABLE
TO COMPLETE THE CALL REQUEST
204
```

```
DETERMINE A PACKET-SWITCHED NETWORK IS
UNAVAILABLE TO COMPLETE A PACKET-SWITCHED
CALL CONNECTION TO A DATA CENTER WITH A
MESSAGE SERVER
206
```

```
ESTABLISH A CIRCUIT-SWITCHED CALL CONNECTION
WITH THE DATA CENTER OVER A CIRCUIT-SWITCHED
NETWORK WHEN THE PACKET-SWITCHED NETWORK
IS UNAVAILABLE
208
```

```
SEND CALL TERMINAL IDENTIFICATION
INFORMATION UNIQUELY IDENTIFYING THE CALL
TERMINAL FROM THE GATEWAY TO THE DATA
CENTER OVER THE CIRCUIT-SWITCHED CALL
CONNECTION TO ALLOW THE MESSAGE SERVER TO
RECORD A MESSAGE FOR THE CALL TERMINAL
210
```

RECEIVE A CALL REQUEST OVER A CIRCUIT-SWITCHED NETWORK FROM A BRANCH OFFICE TO ACCESS MESSAGE SERVICES ON BEHALF OF A CALL TERMINAL BY A DATA CENTER WITH A MESSAGE SERVER
302

SEND A CALL RESPONSE TO ESTABLISH A CIRCUIT-SWITCHED CALL CONNECTION BETWEEN THE BRANCH OFFICE AND THE DATA CENTER OVER THE CIRCUIT-SWITCHED NETWORK
304

RECEIVE CALL TERMINAL IDENTIFICATION INFORMATION UNIQUELY IDENTIFYING THE CALL TERMINAL OVER THE CIRCUIT-SWITCHED CALL CONNECTION FROM THE BRANCH OFFICE
306

RECORD A MESSAGE FOR THE CALL TERMINAL BY THE MESSAGE SERVER USING THE CALL TERMINAL IDENTIFICATION INFORMATION
308

TECHNIQUES TO ACCESS MESSAGING SERVICES FOR BRANCH OFFICES

CROSS-REFERENCE TO RELATED APPLICATION

This application is a continuation of, claims the benefit of and priority to, previously filed U.S. patent application Ser. No. 11/973,737 entitled "Techniques to Access Messaging Services for Branch Offices" filed on Oct. 10, 2007, the subject matter of which is hereby incorporated by reference in its entirety.

BACKGROUND

Unified messaging systems are positioned as centralized messaging solutions providing advantages in deployment cost, security and simplicity when compared to legacy voice mail systems implemented at each company location. One design goal for unified messaging systems may be to reduce the intelligence and complexity of the systems deployed in branch offices, while providing the same level of service to the users located in those offices. For example, a unified messaging system may implement a Voice Over Internet Protocol (VoIP) gateway at each branch office for an enterprise to provide VoIP services, such as establishing, managing and terminating packet-switched call sessions between multiple call terminals. The gateways may be arranged to communicate with a unified messaging server executed at a centralized data center over a data network, such as a Wide Area Network (WAN). The unified messaging server may provide certain messaging solutions for the branch office, such as recording and storing voice mail messages on behalf of call terminals typically serviced by the branch office when the call terminals are unavailable for a call session. Users of this centralized solution, however, may need assurances that some form of voice mail service will be maintained if the data network service connecting the branch office to the data center is interrupted. This is provided today by existing unified messaging systems by deploying more and more complex equipment at the branch offices, which may be inconsistent with the centralized model suitable for some unified messaging systems.

SUMMARY

Various embodiments may be generally directed to communications systems. Some embodiments may be particularly directed to improvements for unified messaging systems having distributed branch offices and a centralized messaging services architecture. In one embodiment, for example, a unified messaging system may comprise multiple branch offices each in communication with a centralized data center. The centralized data center may provide various data services for call terminals serviced by the respective branch offices, such as unified messaging services provided by a unified messaging server. For example, the unified messaging server may provide voice mail services among other services. The multiple branch offices may each provide call services for various internal clients for a business or enterprise located within a specific geographic region. One example of an internal client may include a call terminal. Whenever an incoming call request for a call terminal serviced by the branch office is unavailable, the branch office may route, forward or deflect the call request to the unified messaging server at the data center to access voice mail services for the call terminal.

In one embodiment, for example, an apparatus such as a branch office may include a network interface for a packet-switched network, a private branch exchange (PBX) for a circuit-switched network, and a gateway to couple to the network interface and the PBX. The gateway may be operative to establish a packet-switched call connection with the network interface and a circuit-switched call connection with the PBX. The gateway may further include a call router to route a call request over a circuit-switched network with the PBX on behalf of a call terminal to access messaging services from a data center with a messaging server when the call terminal and the network interface are unavailable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates one embodiment of a first logic flow.

FIG. 3 illustrates one embodiment of a second logic flow.

DETAILED DESCRIPTION

Various embodiments may be generally directed to improved techniques to access unified messaging services for branch offices. Some embodiments may be particularly directed to improved techniques for branch offices to access unified messaging services provided by a unified messaging server implemented by a remote data center. In one embodiment, for example, an apparatus such as a branch office may include various packet-switched network interfaces or circuit-switched devices to access the unified messaging server over different networks, such as a packet-switched network and a circuit-switched network. In the event of failure of one of the network interfaces or devices, the branch office may utilize one of the other network interfaces or devices to access the unified messaging server of the remote data center. For example, if the packet-switched network is unavailable or undesirable, the branch office may use the circuit-switched device to access messaging services provided by the unified messaging server of the remote data center.

In one embodiment, for example, an apparatus such as a branch office may include a network interface for a packet-switched network, a PBX for a circuit-switched network, and a gateway to couple to the network interface and the PBX. The gateway may be operative to establish a packet-switched call connection with the network interface and a circuit-switched call connection with the PBX. The gateway may further include a call router to route a call request over a circuit-switched network with the PBX on behalf of a call terminal to access messaging services from a data center with a messaging server when the call terminal and the network interface are unavailable. In this manner, the branch office may have more robust and reliable access to the unified messaging services offered by the remote data center, thereby reducing dropped or missed calls for call terminals serviced by the branch offices.

Figure 1:
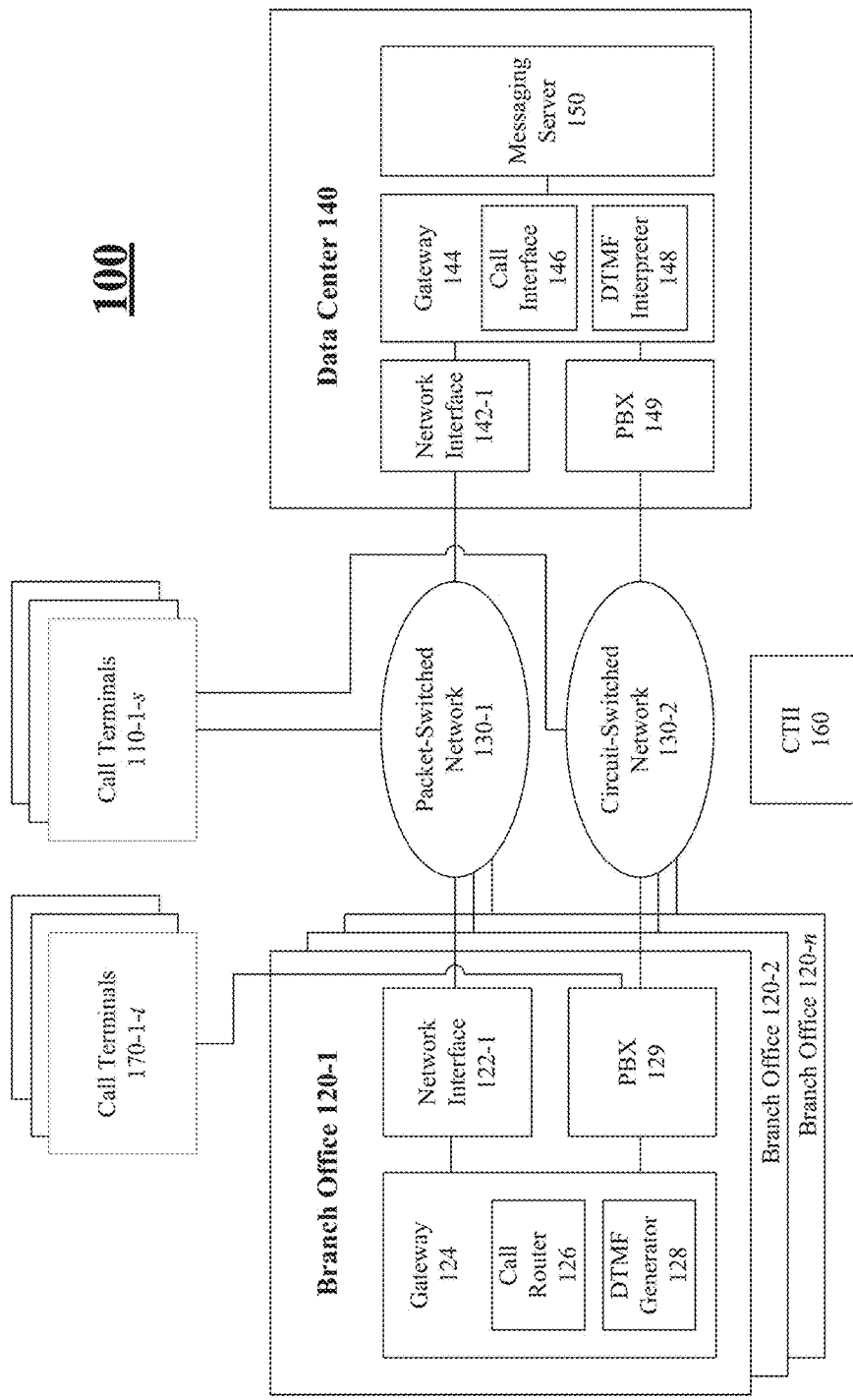
FIG. 1 illustrates one embodiment of a communication system.

FIG. 1 illustrates one embodiment of a communications system 100. The communications system 100 may represent a general system architecture suitable for implementing various embodiments. The communications system 100 may comprise multiple elements. An element may comprise any physical or logical structure arranged to perform certain operations. Each element may be implemented as a hardware element, a software element, or any combination thereof, as desired for a given set of design parameters or performance constraints. Examples of hardware elements may include without limitation devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include without limitation any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the communications system 100 as shown in FIG. 1 has a limited number of elements in a certain topology, it may be appreciated that the communications system 100 may include more or less elements in alternate topologies as desired for a given implementation. The embodiments are not limited in this context.

In the illustrated embodiment shown in FIG. 1, the communications system 100 may include a centralized unified messaging system comprising multiple external call terminals 110-1-s, multiple internal call terminals 170-1-t, multiple branch offices 120-1-n, and at least one data center 140. As shown by an exemplary branch office 120-1, each branch office 120-1-n may further comprise multiple network interfaces 122-1-p and a gateway 124. The gateway 124 may further include a call router 126 and a dual-tone multi-frequency (DTMF) generator 128. The data center 140 may comprise multiple network interfaces 142-1-q, a gateway 144, and a messaging server 150. The gateway 144 may further include a call interface 146 and a DTMF interpreter 148. The call terminals 110-1-s, the call terminals 170-1-t, the branch offices 120-1-n, and the data center 140 may communicate with each other via one or more networks 130-1-r.

In various embodiments, the branch offices 120-1-n and the data center 140 may interoperate to provide unified messaging services for the internal call terminals 170-1-t serviced by a respective branch office 120-1-n. For example, the branch offices 120-1-n may establish, manage and terminate call sessions between the external call terminals 110-1-s and the internal call terminals 170-1-t. Furthermore, the branch offices 120-1-n may provide various call services specifically for the internal call terminals 170-1-t, such as access to various messaging services provided by the data center 140. The data center 140 may provide various data services for the internal call terminals 170-1-t serviced by the respective branch offices, such as unified messaging services provided by a unified messaging server 150. For example, whenever an internal call terminal 170-1-t serviced by a branch office 120-1-n is unavailable to accept an incoming call request from an external call terminal 110-1-s, the gateway 124 may be arranged to route, forward or deflect the call request to the data center 140 with the unified messaging server 150 to access various messaging services, such as voice mail services for the unavailable call terminal 170-1-t.

In various embodiments, the multiple branch offices 120-1-n may each provide call services for various internal clients for a business or enterprise located within a specific geographic region. In some cases, the branch offices 120-1-n may be considered smaller or distributed offices within a larger corporate organization. The branch offices 120-1-n are typically located within, and provide call services for, employees and call terminals for the employees within a defined geographic region (e.g., towns, cities or states). As such, the branch offices 120-1-n are typically located geographically remote from each other and the data center 140. As a result, the branch offices 120-1-n may communicate with the data center 140 over the various networks 130-1-r. For example, the branch offices 120-1-n may communicate with the data center 140 over a data network utilizing packet-switched technologies, referred to herein as a packet-switched network 130-1. The packet-switched network 130-1 may comprise any network capable of transporting call information utilizing various packet-switched protocols, such as the Transport Control Protocol (TCP), User Datagram Protocol (UDP), and Internet Protocol (IP), and various VoIP protocols, to name just a few. Examples for the packet-switched network 130-1 may include the public Internet and private enterprise networks. The branch offices 120-1-n may also communicate with the data center 140 over a voice network utilizing circuit-switched technologies, referred to herein as a circuit-switched network 130-2. The circuit-switched network 130-2 may include any network capable of transporting call information utilizing various circuit-switched protocols, such as Pulse Code Module (PCM). An example for the circuit-switched network 130-2 may include the Public Switched Telephone Network (PSTN), a private voice network, among others.

In one embodiment, the communications system 100 includes multiple external call terminals 110-1-s. The external call terminals 110-1-s may each comprise or be implemented as any electronic device having call capabilities. Furthermore, the external call terminals 110-1-s may comprise those call terminals that are not part of a private enterprise network managed or serviced by the branch offices 120-1-n. Examples of external call terminals 110-1-s may include without limitation a phone, a telephone, a plain old telephone service (POTS) telephone, an analog telephone, a digital telephone, a Voice Over Internet Protocol (VoIP) telephone, a Voice Over Packet (VOP) telephone, an Internet telephone, an Internet Protocol (IP) telephone, a cellular telephone, a smart phone, a combination cellular telephone and personal digital assistant (PDA), a soft telephone (e.g., a processing device executing call software), and so forth.

In one embodiment, the communications system 100 includes multiple internal call terminals 170-1-t. The internal call terminals 170-1-t may comprise or be implemented as some or all of the examples provided for the external call terminals 110-1-s. Furthermore, the internal call terminals 170-1-t may comprise those call terminals that are part of a private enterprise network managed or serviced by the branch offices 120-1-n. In one embodiment, for example, the private enterprise network may comprise a VoIP network, and the internal call terminals 170-1-t may be implemented as digital or analog call terminals.

In one embodiment, the multiple branch offices 120-1-n may each provide call services for various internal clients such as the internal call terminals 170-1-t implemented as one or more call terminals. Each branch office 120-1-*n* may include branch office infrastructure equipment to establish, manage and terminate call sessions between the various internal call terminals 170-1-*t* and the various external call terminals 110-1-*s*. Examples of branch office infrastructure equipment may include without limitation different network interfaces, call managers, gateways, gatekeepers, application servers, call servers, PBX devices, VoIP appliances, and so forth. More particularly, each branch office 120-1-*n* may include branch office infrastructure equipment to establish, manage and terminate VoIP and conventional call sessions between the various internal call terminals 170-1-*t* and the various external call terminals 110-1-*s* communicating over various types of networks 130-1-*r*, including a packet-switched network 130-1 and a circuit-switched network 130-2.

As shown by an exemplary branch office 120-1, each branch office 120-1-*n* may comprise multiple network interfaces 122-1-*p*. The network interfaces 122-1-*p* may represent different network interfaces suitable for communicating signals over a particular type of network. In one embodiment, for example, the network interface 122-1 may represent a packet-switched network interface suitable for communicating packet-switched signals over the packet-switched network 130-1. The packet-switched network interface 122-1 may comprise or be implemented as a network interface card, a line card, a physical layer (PHY) device, and so forth. The network interfaces 122-1-*p* may also include other interfaces as well, including certain network interfaces suitable for communicating over the circuit-switched network 130-2 as desired for a given implementation. Furthermore, the network interfaces 122-1-*p* may be implemented as wired interfaces, wireless interfaces, or a combination of both. When implemented as wireless interfaces, the network interfaces 122-1-*p* may include various wireless components, such as wireless radios, wireless transmitters, wireless receivers, wireless transceivers, amplifiers, baseband processors, antennas and so forth.

In one embodiment, for example, each of the branch offices 120-1-*n* may include a PBX 129. The PBX 129 may represent an example of a circuit-switched device suitable for communicating circuit-switched signals over the circuit-switched network 130-2. A PBX is generally a telephone exchange that serves a particular business or office, as opposed to one that a common carrier or telephone company operates for many businesses or for the general public. A PBX is sometimes referred to as a private automatic branch exchange (PABX) or an electronic private automatic branch exchange (EPABX). A PBX device typically operates as a connection between a private organization (e.g., a business) and the PSTN. Because they incorporate telephones, fax machines, modems, and more, the general term "extension" is used to refer to any end point on the branch. The PBX handles calls between these extensions as well as connections to the PSTN via trunk lines. Although some embodiments may describe the PBXs 129, 149 as circuit-switched devices, it may be appreciated that the PBXs 129, 149 may also be implemented as packet-switched devices as well. In the latter case, packet capable PBXs 129, 149 may be implemented as IP-based versions of conventional PBXs, sometimes referred to as an IP PBX or iPBX, for example.

In various embodiments, the gateways 124, 144 may be arranged to provide various VoIP services for the respective branch offices 120-1-*n* and the data center 140. For example, the gateways 124, 144 may be arranged to establish a VoIP telephone call or conference call using a VoIP signaling protocol as defined and promulgated by the Internet Engineering Task Force (IETF) standards organization, such as the Session Initiation Protocol (SIP) as defined by the IETF series RFC 3261, 3265, 3853, 4320 and progeny, revisions and variants. In general, the SIP signaling protocol is an application-layer control and/or signaling protocol for creating, modifying, and terminating sessions with one or more participants. These sessions include IP telephone calls, multimedia distribution, and multimedia conferences. In one embodiment, for example, the gateways 124, 144 may establish a VoIP conference call using a data or media format protocol, such as the Real-time Transport Protocol (RTP) and Real-time Transport Control Protocol (RTCP) as defined by the IETF RFC 3550 and progeny, revisions and variants. The RTP/RTCP standard defines a uniform or standardized packet format for delivering multimedia information (e.g., audio and video) over a packet-switched network, such as the packet-switched network 130-1. Although some embodiments may utilize the SIP and RTP/RTCP protocols by way of example and not limitation, it may be appreciated that other VoIP protocols may also be used as desired for a given implementation.

In one embodiment, the gateway 124 and/or the PBX 129 may be arranged to convert incoming call information from an external call terminal 110-1-*s* communicating over a circuit-switched network 130-2 from circuit-switched signals to packet-switched signals suitable for an internal call terminal 170-1-*t*, and vice-versa. This may be accomplished, for example, using the circuit-switched PBX 129 to receive circuit-switched signals from the circuit-switched network 130-2, and the gateway 124 having the appropriate signal conversion equipment to convert the circuit-switched signals to packet-switched signals.

In one embodiment, the gateway 124 may further include a call router 126 to route a call request over the circuit-switched network 130-2 with the PBX 129 on behalf of an internal call terminal 170-1-*t* to access messaging services from the data center 140 with the messaging server 150 when the internal call terminal 170-1-*t* and the network interface 122-1 are unavailable. For example, whenever an internal call terminal 170-1-*t* serviced by a branch office 120-1-*n* is unavailable to accept an incoming call request from an external call terminal 110-1-*s* or another internal call terminal 170-1-*t*, the gateway 124 of the branch office 120-1-*n* may be arranged to route, forward or deflect the call request to the data center with the unified messaging server to access various messaging services, such as voice mail services for the unavailable call terminal. In some embodiments, for example, the gateway 124 may include a call router 126 arranged to perform the call routing operations. The call router 126 may be arranged to route call requests over the packet-switched network 130-1 using the packet-switched network interface 122-1 as a primary transport. In addition, the call router 126 may be arranged to route call requests over the circuit-switched network 130-2 using the circuit-switched PBX 129 as a secondary transport or backup transport whenever the primary transport is unavailable or undesirable. In this manner, the gateway 124 may utilize multiple connection routes or paths when requesting messaging services on behalf of an internal call terminal 170-1-*t* from the data center 140 with the messaging server 150, thereby ensuring the distributed branch offices have more robust or redundant access to messaging services from the data center in case of network failure.

In one embodiment, the call router 126 may be operative to establish a circuit-switched call connection over the circuit-switched network 130-2 with the PBX 129, and send call terminal identification information 160 uniquely identifying the internal call terminal 170-1-*t* over the circuit-switched call connection to allow the messaging server 150 to record a message for the internal call terminal 170-1-*t*. Whenever the call router 126 routes a call request to an internal call terminal 170-1-*t* to the data center 140 over the circuit-switched network 130-2, the messaging server 150 may not necessarily have sufficient information to identify a voice or message mail box associated with the internal call terminal 170-1-*t* that is the intended receiving device for the call request. Consequently, the call router 126 may also send call terminal identification information 160 to uniquely identify the receiving internal call terminal 170-1-*t* that is the end point for the call request. The call terminal identification information 160 may include any information suitable for uniquely identifying an internal call terminal 170-1-*t* or a mail box for an internal call terminal 170-1-*t*, various examples of which are provided below.

In various embodiments, the call router 126 may be arranged to send the call terminal identification information 160 over a circuit-switched call connection using DTMF signals. In one embodiment, the gateway 124 may include a DTMF generator 128. The DTMF generator 128 may be arranged to generate certain DTMF signals corresponding to certain alphanumeric or symbolic information. For example, the DTMF generator 128 will generate and emit the tones in accordance with the International standards associated with DTMF signal generation. The call router 126 may control the DTMF generator 128 to generate a sequence of DTMF signals to represent the call terminal identification information 160, and send the DTMF sequence from the branch office 120-1-*n* to the data center 140 over a circuit-switched call connection.

The DTMF generator 128 may generate the DTMF sequence having any desired message format that is understood by a matching DTMF interpreter 148 implemented by the gateway 144 of the data center 140. Once a circuit-switched call connection is established between the branch office 120-1-*n* and the data center 140, the call router 126 may instruct the DTMF generator 128 to generate a DTMF sequence having a message format with a DTMF signal representing a start message delimiter and another DTMF signal representing an end message delimiter. For example, the start message delimiter may comprise a DTMF signal corresponding to a "*" character or symbol, a series of DTMF signals corresponding numbers representing the call terminal identification information 160 (e.g., "1234"), and the end message delimiter may comprise a DTMF signal corresponding to a "#" character or symbol. The DTMF interpreter 148 may detect the start message delimiter, begin to read the call terminal identification information 160 after detecting the start message delimiter, and detect the end message delimiter to stop reading the call terminal identification information 160. It may be appreciated that although some embodiments may use control signals generated in accordance with DTMF techniques, any signaling technique may be used suitable for communication over the circuit-switched network 130-2. In this case, any defined text, characters, numbers, symbols, pictures, images, icons, or other information may be used to represent the start message delimiter, the end message delimiter, and the actual call terminal identification information, as desired for a given implementation.

The call router 126 may send various types of call terminal identification information 160 as desired for a given set of design constraints and performance parameters. The call router 126 may instruct the DTMF generator 128 to generate a sequence of DTMF signals to represent the particular type of call terminal identification information 160 implemented for a given unified messaging system. The branch office 120-1-*n* may send the DTMF sequence from the branch office 120-1-*n* to the data center 140 using the circuit-switched call connection established over the circuit-switched network 130-2 using the circuit switched devices 129, 149.

In one embodiment, for example, assume each branch office 120-1-*n* is assigned a corresponding branch office identifier to uniquely identify the respective branch office 120-1-*n*. Further assume each internal call terminal 170-1-*t* is assigned a corresponding call terminal extension to uniquely identify the respective internal call terminal 170-1-*t* for a given branch office 120-1-*n*. In this case, the call router 126 may instruct the DTMF generator 128 to generate a sequence of DTMF tones representing a branch office identifier for the branch office 120-1-*n* forwarding the call request, and a call terminal extension for the internal call terminal 170-1-*t* that is the receiving internal call terminal 170-1-*t* for the call request. The branch office 120-1-*n* may send the DTMF sequence from the branch office 120-1-*n* to the data center 140 using the circuit-switched call connection established over the circuit-switched network 130-2 using the circuit switched network devices 129, 149.

In one embodiment, for example, each branch office 120-1-*n* may be assigned a unique telephone number to access the data center 140. In this case, a given branch office 120-1-*n* may be identified by the particular telephone number used to communicate the re-routed call request to the data center 140, and the call router 126 may instruct the DTMF generator 128 to generate a sequence of DTMF tones representing only a call terminal extension for the internal call terminal 170-1-*t* that is the receiving internal call terminal 170-1-*t* for the call request.

In one embodiment, for example, assume each branch office 120-1-*n* is assigned a corresponding branch office telephone number to uniquely contact the respective branch office 120-1-*n*. Further assume each internal call terminal 170-1-*t* is assigned a corresponding call terminal extension to uniquely identify the respective internal call terminal 170-1-*t* for a given branch office 120-1-*n*. In this case, the call router 126 may instruct the DTMF generator 128 to generate a sequence of DTMF tones representing a branch office telephone number for the branch office 120-1-*n* forwarding the call request, and a call terminal extension for the internal call terminal 170-1-*t* that is the receiving internal call terminal 170-1-*t* for the call request. Alternatively, the data center 140 may automatically recognize an incoming calling number as associated with a particular branch office 120-1-*n*, in which case the call router 126 may instruct the DTMF generator 128 to generate a sequence of DTMF tones representing only a call terminal extension for the internal call terminal 170-1-*t* that is the receiving internal call terminal 170-1-*t* for the call request. The branch office 120-1-*n* may send the DTMF sequence from the branch office 120-1-*n* to the data center 140 using the circuit-switched call connection established over the circuit-switched network 130-2 using the circuit switched network devices 129, 149.

In one embodiment, for example, assume each internal call terminal 170-1-*t* is assigned a corresponding globally unique identifier (GUID) to uniquely identify the respective internal call terminal 170-1-*t* regardless of the branch office 120-1-*n* servicing the internal call terminal 170-1-*t*. For example, the GUID may be an internationally unique telephone number or a unique telephone number within a specific company, organization or enterprise. In this case, the call router 126 may instruct the DTMF generator 128 to generate a sequence of DTMF tones representing the GUID for the internal call terminal 170-1-*t* that is the receiving internal call terminal 170-1-*t* for the call request. The branch office 120-1-*n* may send the DTMF sequence from the branch office 120-1-*n* to the data center 140 using the circuit-switched call connection established over the circuit-switched network 130-2 using the circuit switched network devices 129, 149.

As previously described, the data center 140 may provide various data services for the internal call terminals 170-1-*t* serviced by the respective branch offices 120-1-*n*, such as various messaging services provided by the messaging server 150. To accomplish this, the data center 140 may include multiple network interfaces 142-1-*q*. The network interfaces 142-1-*q* may represent different network interfaces suitable for communicating signals over a particular type of network. In one embodiment, for example, the network interface 142-1 may represent a packet-switched network interface suitable for communicating packet-switched signals over the packet-switched network 130-1. The packet-switched network interface 142-1 may comprise or be implemented as a network interface card, a line card, a PHY device, and so forth. The network interfaces 142-1-*q* may also include other interfaces as well, including certain network interfaces suitable for communicating over the circuit-switched network 130-2 as desired for a given implementation. Furthermore, the network interfaces 142-1-*q* may be implemented as wired interfaces, wireless interfaces, or a combination of both. When implemented as wireless interfaces, the network interfaces 142-1-*q* may include various wireless components, such as wireless radios, wireless transmitters, wireless receivers, wireless transceivers, amplifiers, baseband processors, antennas and so forth.

In one embodiment, for example, the data center may include a PBX 149. Similar to the PBX 129 of the branch offices 120-1-*n*, the PBX 149 may represent an example of a circuit-switched device suitable for communicating circuit-switched signals over the circuit-switched network 130-2.

In one embodiment, the data center 140 may comprise a gateway 144. The gateway 144 may be arranged to generally manage call sessions between the external call terminals 110-1-*s* and the messaging server 150 as routed through the branch offices 120-1-*n*. Furthermore, the gateway 144 may include suitable signal conversion equipment to convert incoming call information from an external call terminal 110-1-*s* communicating over a circuit-switched network 130-2 from circuit-switched signals to packet-switched signals suitable for the messaging server 150, and vice-versa. This may be accomplished, for example, using the circuit-switched network PBX 149 to receive circuit-switched signals from the circuit-switched network 130-2, and the gateway 144 having the appropriate signal conversion equipment to convert the circuit-switched signals to packet-switched signals for communication with the messaging server 150.

In various embodiments, the data center 140 may comprise a messaging server 150. The messaging server 150 may generally be arranged to provide various messaging services for the internal call terminals 170-1-*t* as serviced by the branch offices 120-1-*n*. Examples of messaging services may include without limitation providing voice mail messaging services for a voice mail box associated with a given internal call terminal 170-1-*t*, such as recording an answering message, playing an answering message for a caller, recording a voice mail message, storing a voice mail message, playing back the voice mail message for an operator or user, provide administrative operations to manage a voice mail box, and so forth. In one embodiment, for example, the messaging server 150 may comprise or be implemented as a unified messaging server to provide other messaging services for the internal call terminals 170-1-*t*, such as electronic mail (email) services, instant messaging (IM) services, text messaging services, group message chat services, facsimile services, and so forth. For example, the messaging server 150 may comprise or be implemented as a MICROSOFT® EXCHANGE UNIFIED MESSAGING SERVER, as made by Microsoft Corporation, Redmond, Wash. The embodiments, however, are not limited to this example.

In one embodiment, the gateway 144 of the data center 140 may receive the re-routed call request from the branch office 120-1-*n*. For example, the gateway 144 may receive a call request over the circuit-switched network 130-2 from a branch office 120-1-*n* to access messaging services on behalf of an internal call terminal 170-1-*t* by the data center 140 with the messaging server 150. The gateway 144 may receive the circuit-switched signals via the circuit-switched network PBX 149, and convert the circuit-switched signals to packet-switched signals for communication to the messaging server 150. The messaging server 150 may receive the converted call request, and send a call response to establish a circuit-switched call connection between the branch office 120-1-*n* and the data center 140 over the circuit-switched network 130-2. The messaging server 150 may receive call terminal identification information 160 uniquely identifying the internal call terminal 170-1-*t* over the circuit-switched call connection from the branch office 120-1-*n*. The messaging server 150 may identify a voice mail box corresponding to the call terminal identification information 160, and record a message for the internal call terminal 170-1-*t* using the call terminal identification information 160.

In one embodiment, the gateway 144 may be arranged to establish a circuit-switched call connection with the branch office 120-1-*n* rather than the messaging server 150 making the decision to answer the incoming call. For example, the gateway 144 may include a call interface 146 that is arranged to send a call response to establish the circuit-switched call connection between the branch office 120-1-*n* and the data center 140 over the circuit-switched network 130-2. This may be advantageous for several reasons. For example, any modifications needed to implement this embodiment may be limited to the gateway 144. In another example, the call interface 146 may establish the circuit-switched call connection faster be reducing or eliminating information transfers between the gateway 144 and the messaging server 150. In yet another example, the call interface 146 may relieve processing loads for the messaging server 150, thereby freeing resources for use in message operations.

In one embodiment, the gateway 144 may further include a DTMF interpreter 148. The DTMF interpreter 148 may be programmed with logic similar to the DTMF generator 128, and may be used to interpret the DTMF signals received from the DTMF generator 128 of the gateway 122 of the branch office 120-1-*n*. The DTMF interpreter 148 may receive the DTMF sequence from the branch office 120-1-*n*, and interpret the DTMF sequence to retrieve the call terminal identification information 160. The call interface 146 may then generate a message with the interpreted call terminal identification 160, and send the message with the call terminal identification information 160 from the gateway 144 for the data center 140 to the messaging server 150. In one embodiment, for example, the call interface 146 may generate the message with the call terminal identification information 160 in accordance with a VoIP protocol, such as a SIP message for the SIP protocol, for example. One example of a SIP message may comprise a SIP diversion message with the call terminal identification information 160 encoded in a SIP diversion header for the SIP diversion message. In this case, the messaging server 150 receives the incoming call regardless of whether the incoming call is communicated over the packet-switched network 130-1 or the circuit-switched network 130-2. The embodiments, however, are not limited to this example.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints. Other anti-spam activities may be interspersed into these operations.

FIG. 2 illustrates a logic flow 200. The logic flow 200 may be representative of the operations executed by one or more embodiments described herein, such as one or more operations performed by the branch offices 120-1-n, for example. As shown in FIG. 2, the logic flow 200 may receive a call request for a call terminal of a branch office at block 202. The logic flow 200 may determine the call terminal is unavailable to complete the call request at block 204. The logic flow 200 may determine a packet-switched network is unavailable to complete a packet-switched call connection to a data center with a messaging server at block 206. The logic flow 200 may establish a circuit-switched call connection with the data center over a circuit-switched network when the packet-switched network is unavailable at block 208. The logic flow 200 may send call terminal identification information uniquely identifying the call terminal from the gateway to the data center over the circuit-switched call connection to allow the messaging server to record a message for the call terminal at block 210. The embodiments are not limited in this context.

In one embodiment, the logic flow 200 may receive a call request for a call terminal of a branch office at block 202. For example, assume the gateway 124 for a branch office 120-1 receives a call request for an internal call terminal 170-1 from an external call terminal 110-1. In one case, the external call terminal 110-1 may comprise, for example, a call terminal (e.g., a VoIP telephone) and therefore communicates the call request over the packet-switched network 130-1. In this case, the gateway 124 may receive the call request via the packet-switched network interface 122-1. In another case, the external call terminal 110-2 may comprise, for example, an analog call terminal (e.g., a POTS telephone) and therefore communicates the call request over the circuit-switched network 130-2. In this case, the gateway 124 may receive the call request via the circuit-switched PBX 129.

In one embodiment, the logic flow 200 may determine the call terminal is unavailable to complete the call request at block 204. For example, assume the internal call terminal 170-1 is unavailable. The internal call terminal 170-1 may be unavailable for any number of reasons, such as a call terminal being busy or an operator electing not to answer.

In one embodiment, the logic flow 200 may determine a packet-switched network is unavailable to complete a packet-switched call connection to a data center with a messaging server at block 206. For example, since the call terminal 170-1 is unavailable, the call router 126 of the gateway 124 may route the call request to the data center 140 to access messaging services for the internal call terminal 170-1 provided by the messaging server 150. The primary transport to route the call request is typically a WAN connection established over the packet-switched network 130-1 via the packet-switched network interface 122-1. In some cases, however, the packet-switched network 130-1 and/or the packet-switched network interface 122-1 may be unavailable. The packet-switched network 130-1 and/or the packet-switched network interface 122-1 may be unavailable for any number of reasons, such as traffic congestion, failure of one or more packet-switched network infrastructure devices (e.g., a router, bridge or switch), failure of one or more wired or wireless communication links between the packet-switched network infrastructure devices (e.g., a severed cable), failure of the packet-switched network interface 122-1, and so forth.

In one embodiment, the logic flow 200 may establish a circuit-switched call connection with the data center over a circuit-switched network when the packet-switched network is unavailable at block 208. For example, once the gateway 124 determines that the packet-switched network 130-1 and/or the packet-switched network interface 122-1 are unavailable, the call router 126 may establish an alternate call connection over a secondary transport. For example, the call router 126 may establish a circuit-switched call connection with the data center 140 over the circuit-switched network 130-2.

In one embodiment, the logic flow 200 may send call terminal identification information uniquely identifying the call terminal from the gateway to the data center over the circuit-switched call connection to allow the messaging server to record a message for the call terminal at block 210. For example, the messaging server 150 may not have sufficient information to identify a message mail box associated with the internal call terminal 170-1 from the re-routed call request itself. Consequently, the call router 126 may instruct the DTMF generator 128 to generate DTMF signals representing call terminal identification information 160 uniquely identifying the internal call terminal 170-1. The call interface 146 and the DTMF interpreter 148 may be used to interpret the sequence of DTMF signals to retrieve the call terminal identification information 160, and forward this information to the messaging server 150. Once the messaging server 150 identifies the proper message mail box for the internal call terminal 170-1, the messaging server 150 may provide various messaging services for the internal call terminal 170-1, such as playing an answering message, recording a message by the caller, storing a recorded message, playing a recorded message, provide administrative options to manage the message mail box and/or stored messages, and so forth.

FIG. 3 illustrates a logic flow 300. The logic flow 300 may be representative of the operations executed by one or more embodiments described herein, such as for one or more operations performed by the data center 140, for example. As shown in FIG. 3, the logic flow 300 may receive a call request over a circuit-switched network from a branch office to access messaging services on behalf of a call terminal by a data center with a messaging server at block 302. The logic flow 300 may send a call response to establish a circuit-switched call connection between the branch office and the data center over the circuit-switched network at block 304. The logic flow 300 may receive call terminal identification information uniquely identifying the call terminal over the circuit-switched call connection from the branch office at block 306. The logic flow 300 may record a message for the call terminal by the messaging server using the call terminal identification information at block 308. The embodiments are not limited in this context.

In one embodiment, the logic flow 300 may receive a call request over a circuit-switched network from a branch office to access messaging services on behalf of a call terminal by a data center with a messaging server at block 302. For example, assume the gateway 144 of the data center 140 receives the re-routed call request from the branch office 120-1. For example, the gateway 144 may receive a call request over the circuit-switched network 130-2 from the branch office 120-1 to access messaging services on behalf of an internal call terminal 170-1 by the data center 140 with the messaging server 150. The gateway 144 may receive the circuit-switched signals via the circuit-switched network PBX 149, and convert the circuit-switched signals to packet-switched signals for communication to the messaging server 150.

In one embodiment, the logic flow 300 may send a call response to establish a circuit-switched call connection between the branch office and the data center over the circuit-switched network at block 304. For example, the messaging server 150 may receive the converted call request, and send a call response to establish a circuit-switched call connection between the branch office 120-1 and the data center 140 over the circuit-switched network 130-2. In another example, the gateway 144 may be arranged to establish a circuit-switched call connection with the branch office 120-1 rather than the messaging server 150 answering the incoming call directly. For example, the gateway 144 may include a call interface 146 that is arranged to send a call response to establish the circuit-switched call connection between the branch office 120-1 and the data center 140 over the circuit-switched network 130-2.

In one embodiment, the logic flow 300 may receive call terminal identification information uniquely identifying the call terminal over the circuit-switched call connection from the branch office at block 306. For example, the DTMF interpreter 148 may be used to interpret the DTMF signals received from the DTMF generator 128 of the gateway 122 of the branch office 120-1. The DTMF interpreter 148 may receive the DTMF sequence from the branch office 120-1, and interpret the DTMF sequence to retrieve the call terminal identification information 160 for the internal call terminal 170-1. The call interface 146 may then generate a message with the interpreted call terminal identification 160, and send the message with the call terminal identification information 160 from the gateway 144 for the data center 140 to the messaging server 150.

In one embodiment, the logic flow 300 may record a message for the call terminal by the messaging server using the call terminal identification information at block 308. For example, the messaging server 150 may receive call terminal identification information 160 uniquely identifying the internal call terminal 170-1 over the circuit-switched call connection from the branch office 120-1. The messaging server 150 may identify a voice mail box corresponding to the call terminal identification information 160, and record a message for the internal call terminal 170-1 using the call terminal identification information 160.

Figure 4:
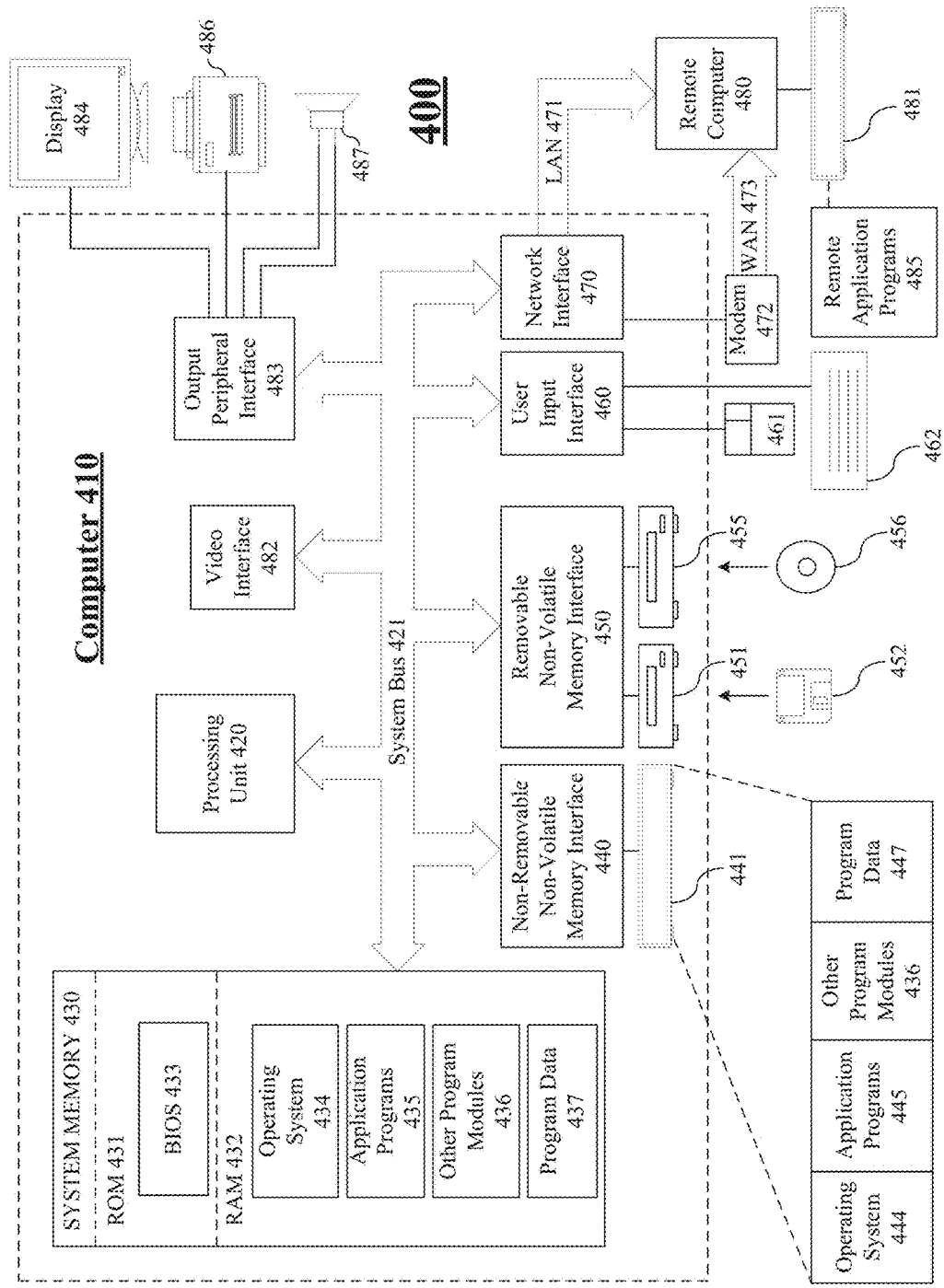
FIG. 4 illustrates one embodiment of a computing system architecture.

FIG. 4 illustrates a block diagram of a computing system architecture 400 suitable for implementing various embodiments, such as various elements of the communications system 100, such as the call terminals 110-1-$s$, 170-1-$t$, the gateways 124, 144, the messaging server 150, and so forth. It may be appreciated that the computing system architecture 400 is only one example of a suitable computing environment and is not intended to suggest any limitation as to the scope of use or functionality of the embodiments. Neither should the computing system architecture 400 be interpreted as having any dependency or requirement relating to any one or combination of components illustrated in the exemplary computing system architecture 400.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 400 includes a general purpose computing device such as a computer 410. The computer 410 may include various components typically found in a computer or processing system. Some illustrative components of computer 410 may include, but are not limited to, a processing unit 420 and a memory unit 430.

In one embodiment, for example, the computer 410 may include one or more processing units 420. A processing unit 420 may comprise any hardware element or software element arranged to process information or data. Some examples of the processing unit 420 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 420 may be implemented as a general purpose processor. Alternatively, the processing unit 420 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 410 may include one or more memory units 430 coupled to the processing unit 420. A memory unit 430 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 410. The embodiments are not limited in this context.

In one embodiment, for example, the computer 410 may include a system bus 421 that couples various system components including the memory unit 430 to the processing unit 420. A system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 410 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 400. Examples of computer readable media for computing system architecture 400 may include, but are not limited to, volatile and/or nonvolatile memory such as ROM 431 and RAM 432. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 430 includes computer storage media in the form of volatile and/or nonvolatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 484 or other type of display device is also connected to the system bus 421 via an interface, such as a video processing unit or interface 482. In addition to the monitor 484, computers may also include other peripheral output devices such as speakers 487 and printer 486, which may be connected through an output peripheral interface 483.

The computer 410 may operate in a networked environment using logical connections to one or more remote computers, such as a remote computer 480. The remote computer 480 may be a personal computer (PC), a server, a router, a network PC, a peer device or other common network node, and typically includes many or all of the elements described above relative to the computer 410, although only a memory storage device 481 has been illustrated in FIG. 4 for clarity. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through an adapter or network interface 470. When used in a WAN networking environment, the computer 410 typically includes a modem 472 or other technique suitable for establishing communications over the WAN 473, such as the Internet. The modem 472, which may be internal or external, may be connected to the system bus 421 via the network interface 470, or other appropriate mechanism. In a networked environment, program modules depicted relative to the computer 410, or portions thereof, may be stored in the remote memory storage device. By way of example, and not limitation, FIG.

4 illustrates remote application programs 485 as residing on memory device 481. It will be appreciated that the network connections shown are exemplary and other techniques for establishing a communications link between the computers may be used. Further, the network connections may be implemented as wired or wireless connections. In the latter case, the computing system architecture 400 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the computing system architecture 400 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multi-processor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   processing a call connection between a data center and a branch office of a communication system comprising a first interface to a packet-switched network and a second interface to a circuit-switched network;
   processing the call connection through the packet-switched network;
   when the packet-switched network is unavailable to complete the call connection, receiving over the circuit-switched network call terminal identification information for a mail box corresponding to the call terminal; and
   recording a message in the mail box at the data center, the message configured in accordance with a Voice-over-IP (VOIP) protocol, the data center operative to provide a messaging service for internal call terminals serviced by the branch office and communicate with the branch office via at least one of the packet-switched network or the circuit-switched network.

2. The method of claim 1 further comprising processing a SIP diversion message with the call terminal identification information encoded in a SIP diversion header of the SIP diversion message.

3. The method of claim 1 further comprising interpreting dual-tone multi-frequency signals to retrieve the call terminal identification information.

4. The method of claim 1 further comprising determining at a gateway of the branch office that the call terminal is unavailable to complete a call request.

5. The method of claim 1, comprising retrieving the call terminal identification information if there is insufficient information for the data center to identify a message mail box associated with the internal call terminal from a call request.

6. The method of claim 1, comprising processing the call terminal identification information over the circuit-switched call connection using a dual-tone multi-frequency signal representing a start message delimiter for the call terminal identification information or a dual-tone multi-frequency signal representing an end message delimiter for the call terminal identification information.

7. The method of claim 1, comprising processing at least one of a branch office identifier for the branch office, or a call terminal extension for the call terminal as part of call terminal identification information, or processing a globally unique identifier for the call terminal as part of the call terminal identification information.

8. An apparatus, comprising:
a messaging server operative to:
process a call connection through a packet-switched network between a data center and a call terminal of a branch office of a communication system comprising a first interface to the packet-switched network and a second interface to a circuit-switched network;
when the packet-switched network is undesirable, receive over the circuit-switched network call terminal identification information for a mail box corresponding to the call terminal; and
record a message in the mail box at the data center, the message configured in accordance with a Voice-over-IP (VOIP) protocol, the data center operative to provide a messaging service for internal call terminals serviced by the branch office and communicate with the branch office via at least one of the packet-switched network or the circuit-switched network.

9. The apparatus of claim 8, wherein the messaging server further operative to process a SIP diversion message with the call terminal identification information encoded in a SIP diversion header of the SIP diversion message.

10. The apparatus of claim 8, wherein the messaging server further operative to interpret dual-tone multi-frequency signals to retrieve the call terminal identification information.

11. The apparatus of claim 8 further comprising a gateway to determine that the call terminal is unavailable to complete a call request.

12. The apparatus of claim 8, wherein the messaging server further operative to retrieve the call terminal identification information if there is insufficient information for the data center to identify a message mail box associated with the internal call terminal from a call request.

13. The apparatus of claim 8, wherein the messaging server further operative to process the call terminal identification information over the circuit-switched call connection using a dual-tone multi-frequency signal representing a start message delimiter for the call terminal identification information or a dual-tone multi-frequency signal representing an end message delimiter for the call terminal identification information.

14. The apparatus of claim 8, wherein the messaging server further operative to process at least one of a branch office identifier for the branch office, a call terminal extension for the call terminal as part of call terminal identification information, or a globally unique identifier for the call terminal as part of the call terminal identification information.

15. A branch office system, comprising:
a first interface for a packet-switched network;
a second interface for a circuit-switched network; and
a gateway to couple to the first interface and the second interface, the gateway operative to process a call connection to a data center through the packet-switched network, determine that the packet-switched network is unavailable to complete the call connection to the data center, and establish an alternate call connection using the circuit-switched network, the gateway having a call router to route, to the data center, a call request to access remote messaging services.

16. The branch office system of claim 15, wherein the second interface comprises a private-branch exchange for the circuit-switched network.

17. The branch office system of claim 16 further comprising a call router operative to establish a circuit-switched call connection over the circuit-switched network with the private branch exchange and send call terminal identification information uniquely identifying the call terminal over the circuit-switched call connection to allow a messaging server to record a message for the call terminal.

18. The branch office system of claim 17, wherein the call router to process a Session Interface Protocol (SIP) message with the call terminal extension.

19. The branch office system of claim 15, the call terminal identification information including a branch office identifier for the branch office and a call terminal extension for the call terminal.

20. The branch office system of claim 15, wherein the gateway to determine that the packet-switched network is undesirable to complete a call connection to the data center that is geographically remote and operative to provide a messaging service for all internal call terminals, the circuit-switched network to route a call request to the data center via the alternate call connection, and communicate dual-tone multi-frequency signals comprising call terminal identification information uniquely identifying a mail box for the call terminal.

* * * * *